July 28, 1953    J. W. OVERBEKE    2,646,754
HYDRAULIC FLUID MECHANISM
Filed Oct. 17, 1946    9 Sheets-Sheet 1

INVENTOR.
JOHN W. OVERBEKE
BY
ATTORNEYS

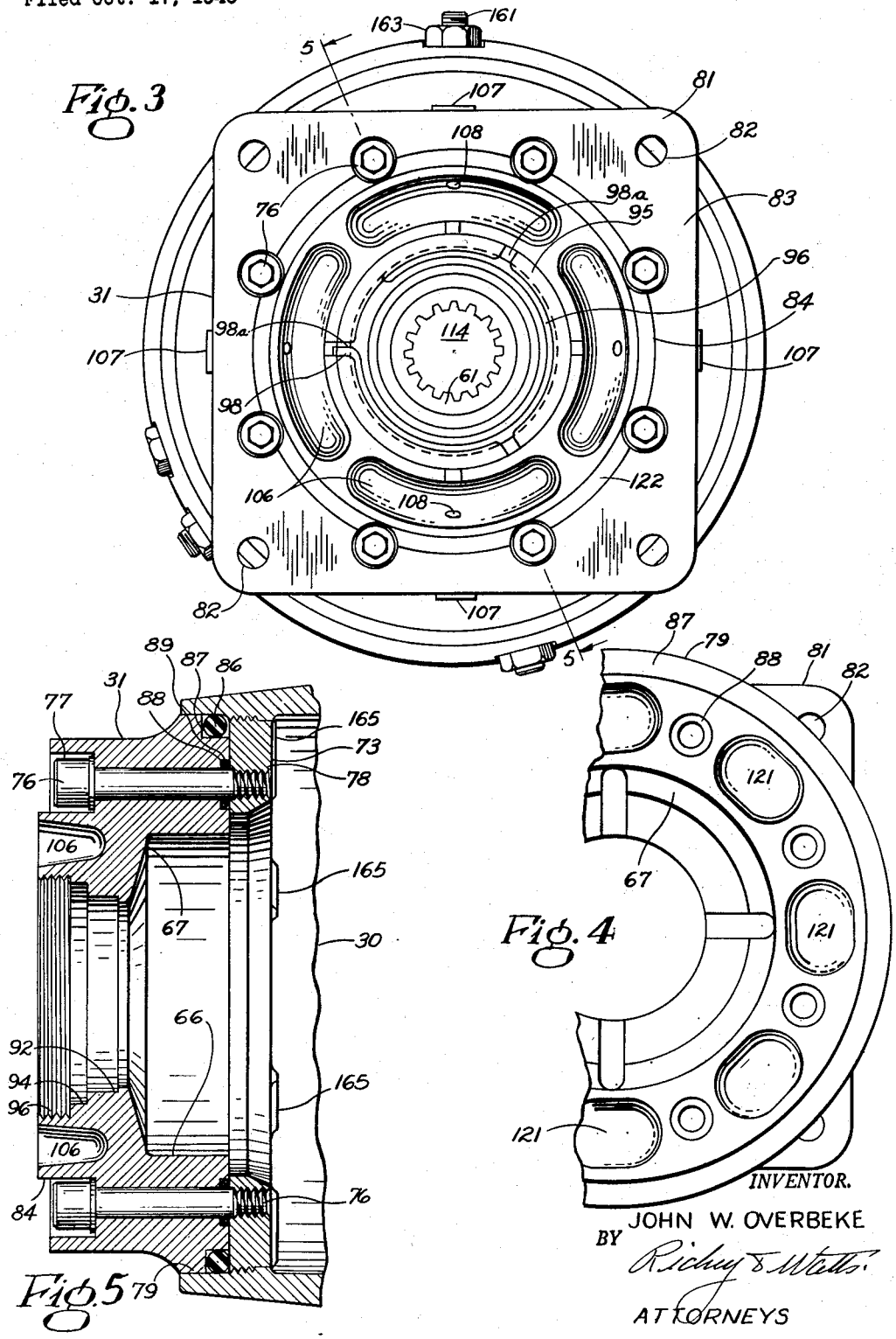

July 28, 1953 J. W. OVERBEKE 2,646,754
HYDRAULIC FLUID MECHANISM
Filed Oct. 17, 1946 9 Sheets-Sheet 5

INVENTOR.
JOHN W. OVERBEKE
BY
ATTORNEYS

July 28, 1953  J. W. OVERBEKE  2,646,754
HYDRAULIC FLUID MECHANISM
Filed Oct. 17, 1946  9 Sheets-Sheet 6

INVENTOR.
JOHN W. OVERBEKE
BY Richey & Watts
ATTORNEYS

July 28, 1953  J. W. OVERBEKE  2,646,754
HYDRAULIC FLUID MECHANISM
Filed Oct. 17, 1946  9 Sheets-Sheet 7

INVENTOR.
JOHN W. OVERBEKE
BY Richey & Watts
ATTORNEYS

July 28, 1953  J. W. OVERBEKE  2,646,754
HYDRAULIC FLUID MECHANISM
Filed Oct. 17, 1946  9 Sheets-Sheet 8

INVENTOR.
JOHN W. OVERBEKE
BY Richey & Watts
ATTORNEYS

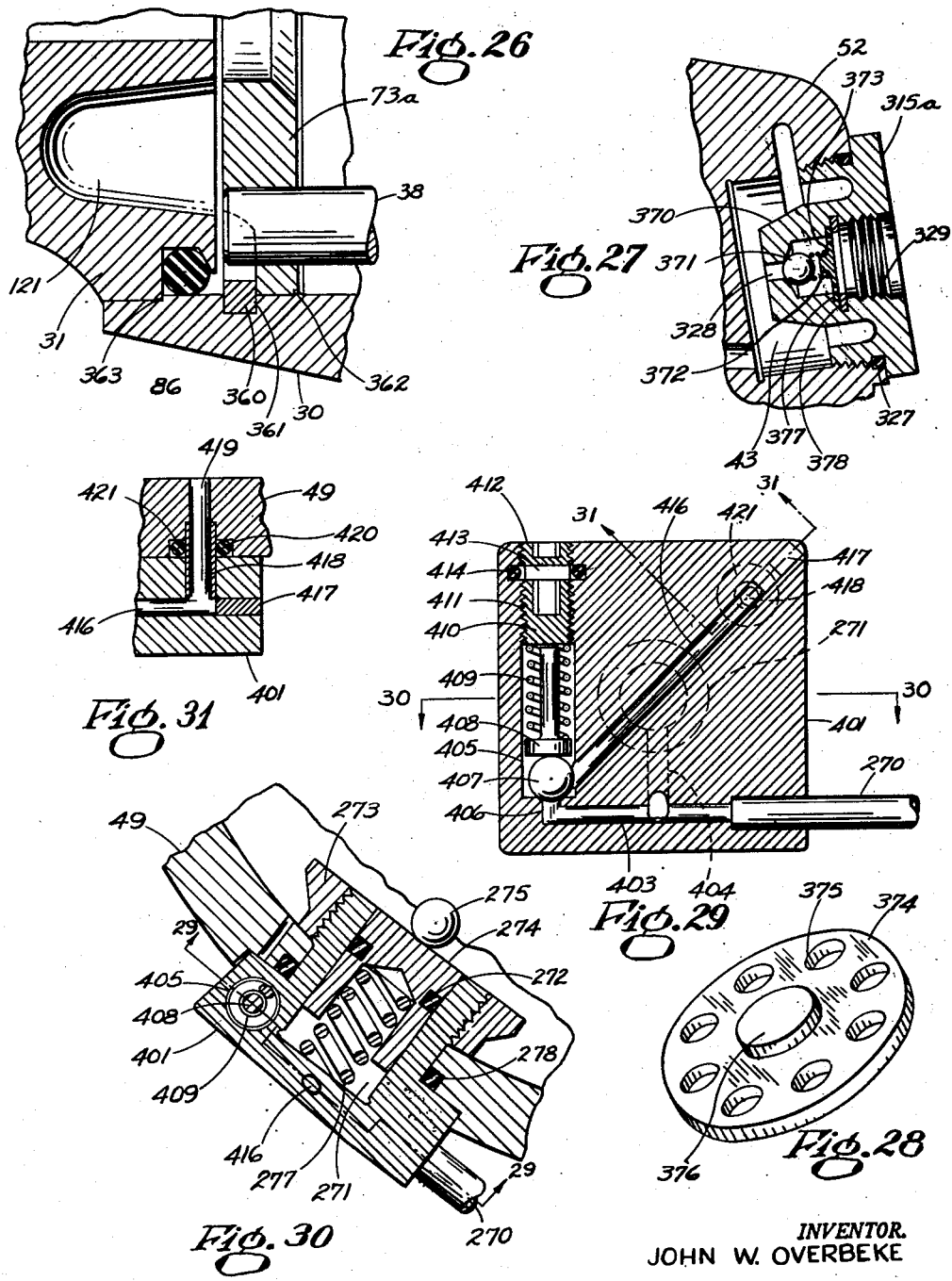

Patented July 28, 1953

2,646,754

UNITED STATES PATENT OFFICE 2,646,754

HYDRAULIC FLUID MECHANISM

John W. Overbeke, Cleveland, Ohio

Application October 17, 1946, Serial No. 703,733

27 Claims. (Cl. 103—161)

This invention relates to hydraulic mechanisms of the positive displacement type. The preferred embodiment, as described herein, is a pump adapted for use in high pressure hydraulic systems, but, as will be apparent to those skilled in the art, many features of the invention are capable of advantageous application to motors, metering devices, flow dividers, and other hydraulic apparatus. However, for brevity in the specification the invention will be referred to as a pump. The embodiment which has been chosen for illustration of the principles of the invention is a high speed, high pressure pump particularly adapted for use in aircraft hydraulic systems by virtue of its light weight, compactness, reliability and self-regulating features.

The objects of the invention include the provision of a pump, motor, or other fluid flow apparatus characterized by the following advantages:

Compactness and light weight.

Adaptability to being driven by a variable speed prime mover such as an aircraft engine.

Susceptibility of high speed operation.

Ability to operate at low speeds.

High output pressure.

Ability to operate with a high vacuum input.

Internal regulation of the output pressure, obviating the need for external relief valves and bypass circuits.

The inclusion of a supercharging stage to insure proper flow of fluid to the displacement stage to prevent cavitation.

Provisions for lubrication of the working parts of the pump.

Quick pump response to sudden increases in output flow demand.

A novel valving mechanism, providing highly effective sealing against leakage of fluid with a minimum of precision fitting of parts.

Means to balance the thrusts on the valve mechanism due to fluid pressure.

A construction facilitating the use of a forged casing and such as to minimize machining requirements for finishing the casing.

A positively driven track ring rotated with the cylinder block and receiving the piston thrusts.

Positive movement of the pistons in their intake strokes.

Quick self-priming action.

The provision of an apparatus incorporating these major objects and advantages involves many novel features of operation and arrangement, too numerous for further recital, which will be apparent to those skilled in the art from the following description.

By way of general description of the pump which has been devised to fulfill the objectives set out above, it is a development of a known type of pump having a fixed casing with a rotatable cylinder block therein, pistons operating in radial bores in the block engaging a track ring eccentric to the axis of the rotor and thereby being reciprocated. A centrifugal impeller mounted on the cylinder block acts as a supercharger in the pump intake. The track ring is pivoted so that its eccentricity may be varied, under the control of an automatic mechanism in the pump, for accommodation to conditions in which flow from the pump is obstructed and to regulate the output pressure of the pump. Valving of flow of fluid through the pump is accomplished by a valve having one member rotatable with the cylinder block and a cooperating member fixed in the casing. Fluid flow devices of this general character are described in my co-pending applications for Hydraulic Fluid Mechanisms, Serial No. 637,699, filed December 28, 1945, now Patent No. 2,620,736; Serial No. 661,716, filed April 12, 1946, now Patent No. 2,552,449; Serial No. 677,714, filed June 19, 1946, now Patent No. 2,620,733; and Serial No. 687,399, filed July 31, 1946, now Patent No. 2,575,528. Certain features disclosed herein are disclosed and claimed in these co-pending applications.

Referring to the drawings:

Fig. 3 is an elevation of the drive end of the pump;

Fig. 4 is a partial elevational view of the inner face of the casing end cap;

Fig. 5 is a sectional view of the casing end cap taken on the plane indicated by the line 5—5 in Fig. 3;

Figure 10:
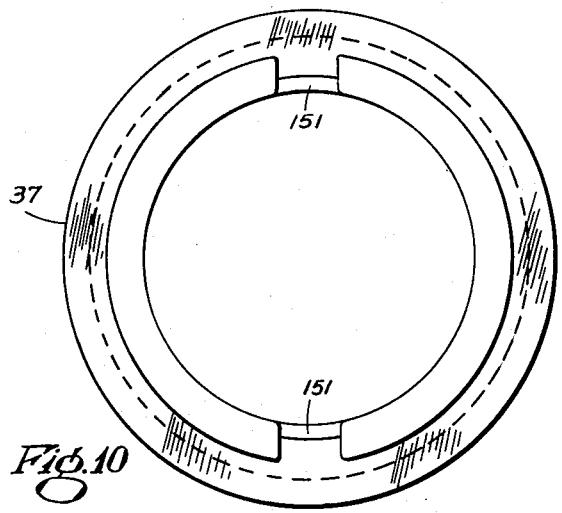
Figure 11:
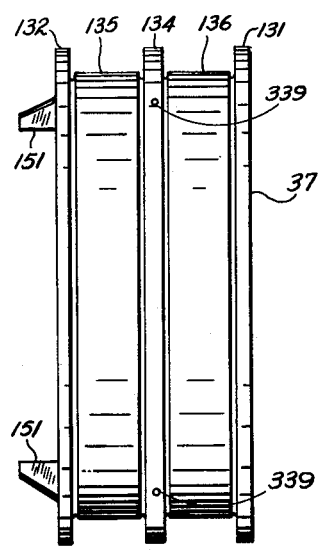
Figure 12:
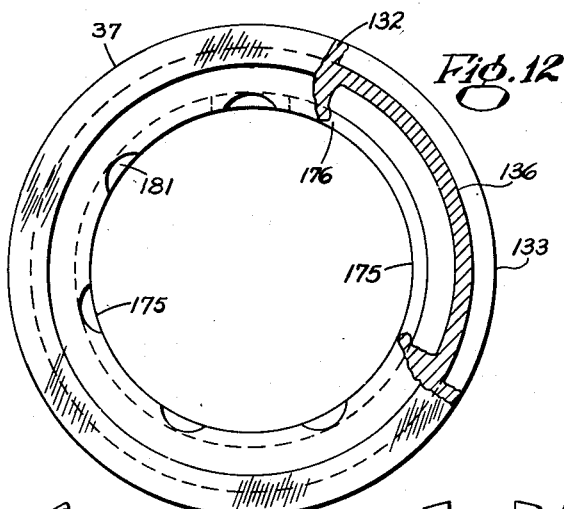
Figure 13:
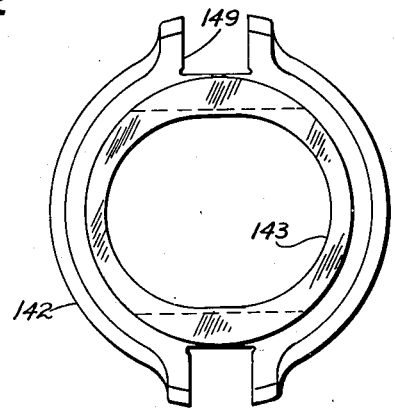
Figures 14, 15:
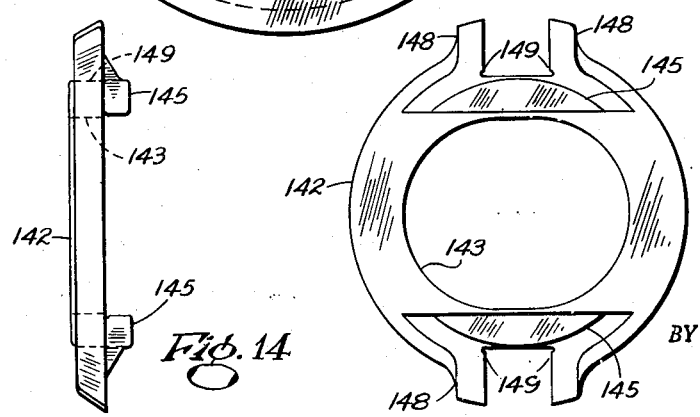
Figure 16:
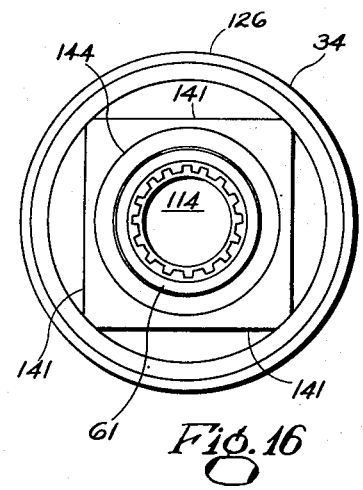
Figure 17:
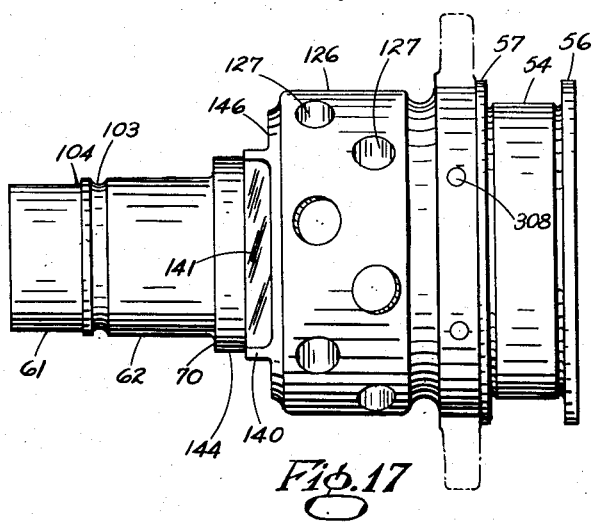
Figure 19:
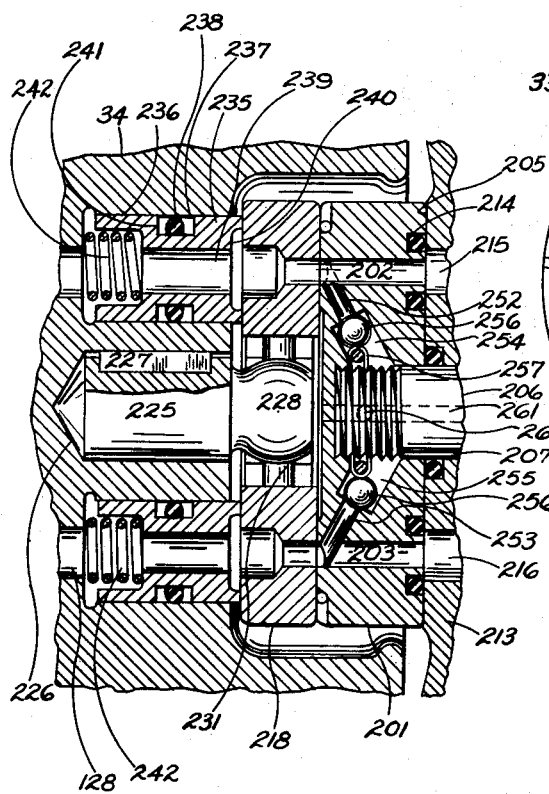
Figure 18:
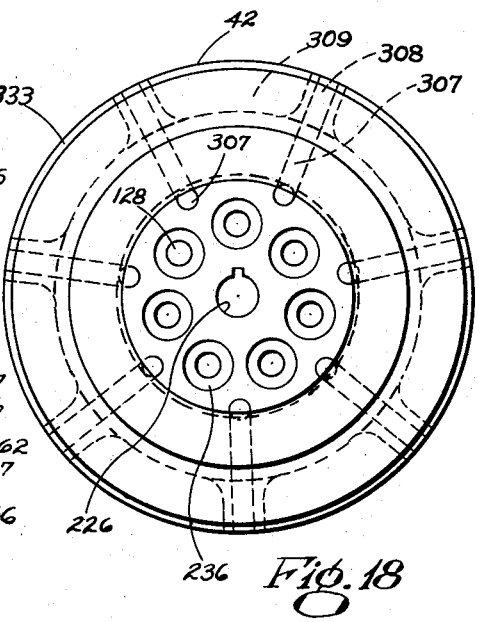
Figure 20:
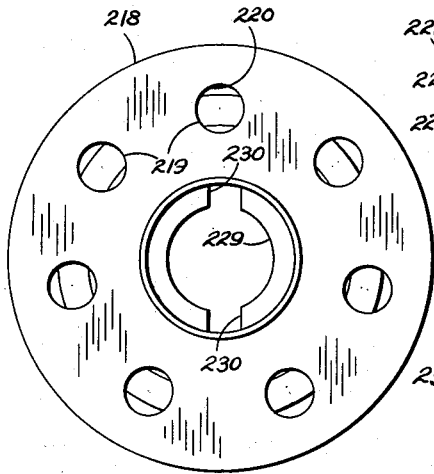
Figure 21:
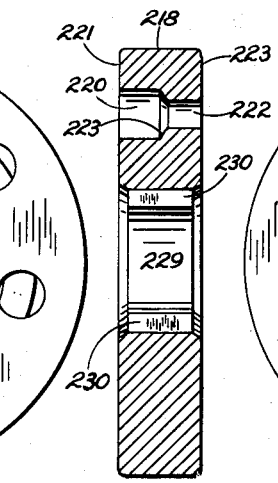
Figure 22:
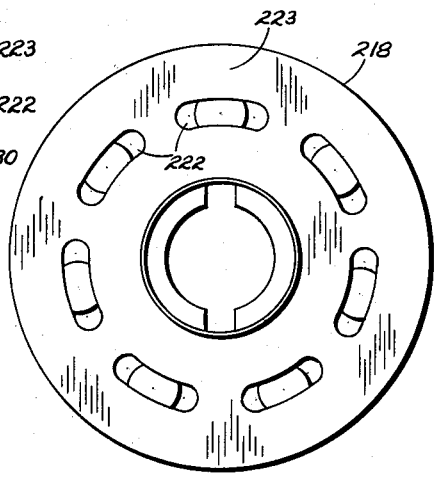
Figure 23:
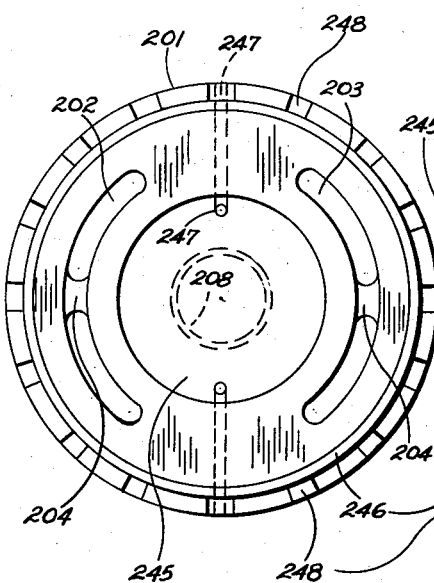
Figure 24:
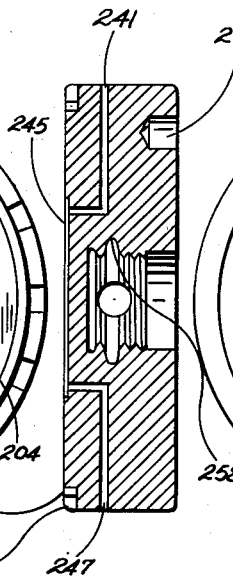
Figure 25:
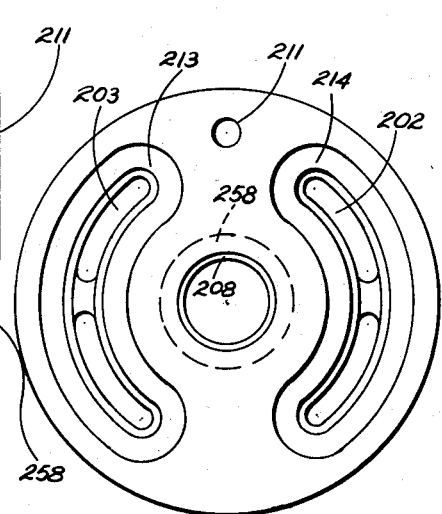

Figs. 10, 11, and 12 are views of the track ring;

Figs. 13, 14, and 15 are views of the intermediate member of an Oldham coupling;

Fig. 16 is a view of the rotor from the drive shaft end;

Fig. 17 is a side view of the rotor;

Fig. 18 is a view of the rotor and centrifugal impeller from the fluid flow end;

Fig. 19 is an enlarged sectional view of a portion of the pump illustrating the valve mechanism;

Figs. 20, 21 and 22 are views of the rotating valve plate;

Figs. 23, 24 and 25 are views of the stationary valve plate;

Fig. 26 is a fragmentary sectional view illustrating a modified structure for securing the end cap;

Fig. 27 is a longitudinal section of a bleed line sleeve incorporating a check valve;

Fig. 28 is a perspective view of a part of the check valve of Fig. 27;

Fig. 29 is a cross section of a modified pressure control device, taken on the plane indicated by the line 29—29 in Fig. 30;

Fig. 30 is a longitudinal section of the modified pressure control device, taken on the plane indicated by the line 30—30 in Fig. 29; and Fig. 31 is a fragmentary sectional view taken on the plane indicated by the line 31—31 in Fig. 29.

General description

Figure 1:
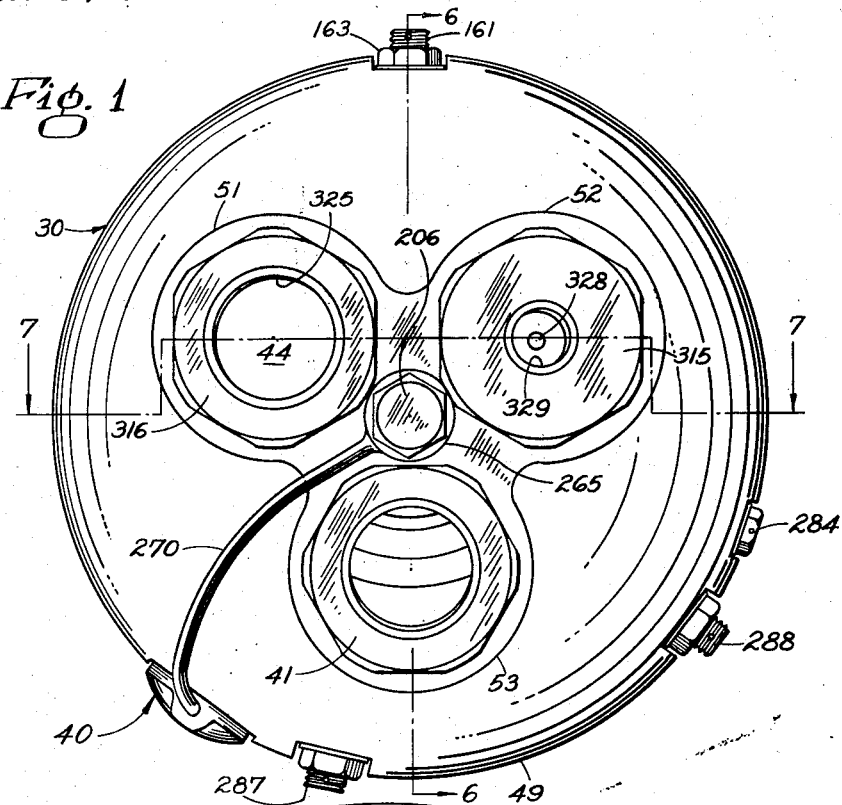
Fig. 1 is an elevation view of the preferred embodiment of the invention as viewed from the intake and discharge end.
Figure 2:
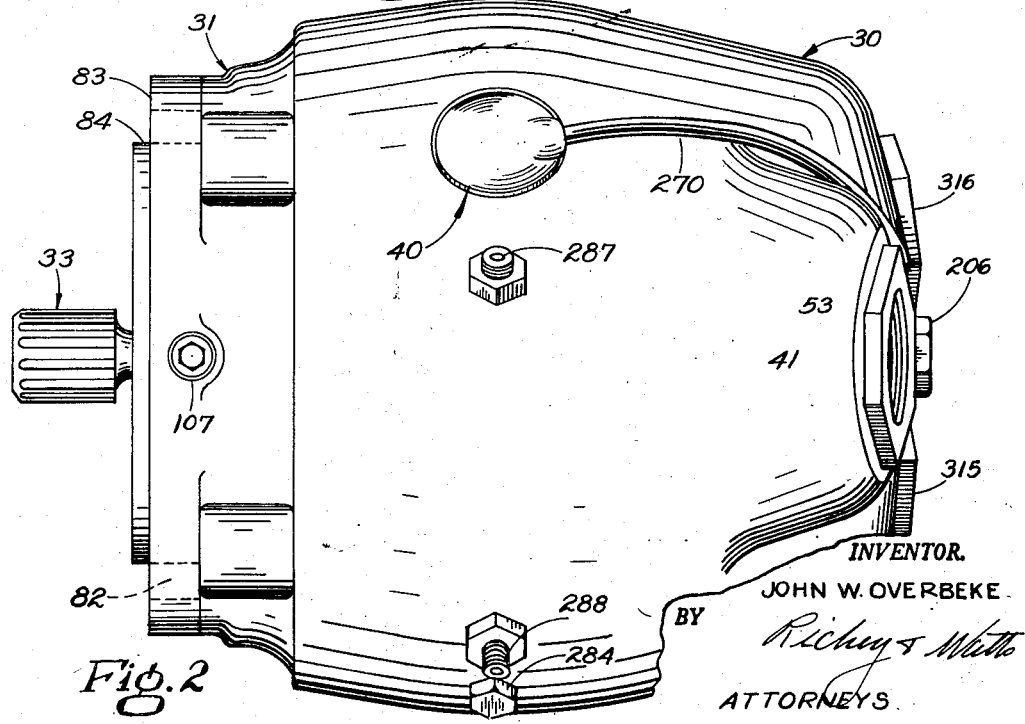
Fig. 2 is a plan view of the pump as viewed from below.
Figure 6:
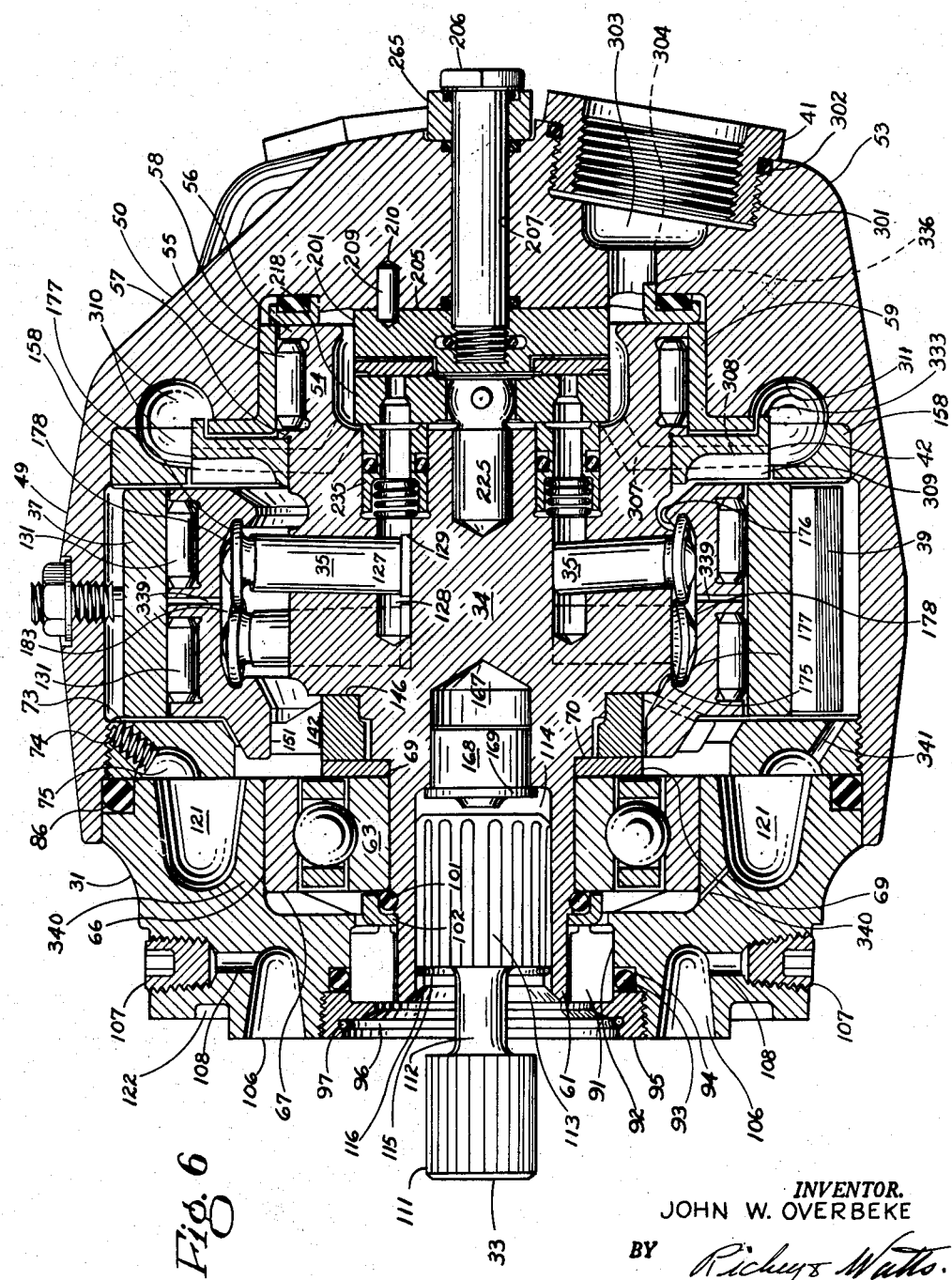
Fig. 6 is a sectional view of the pump taken in a substantially vertical plane through the axis of rotation of the cylinder block.
Figure 7:
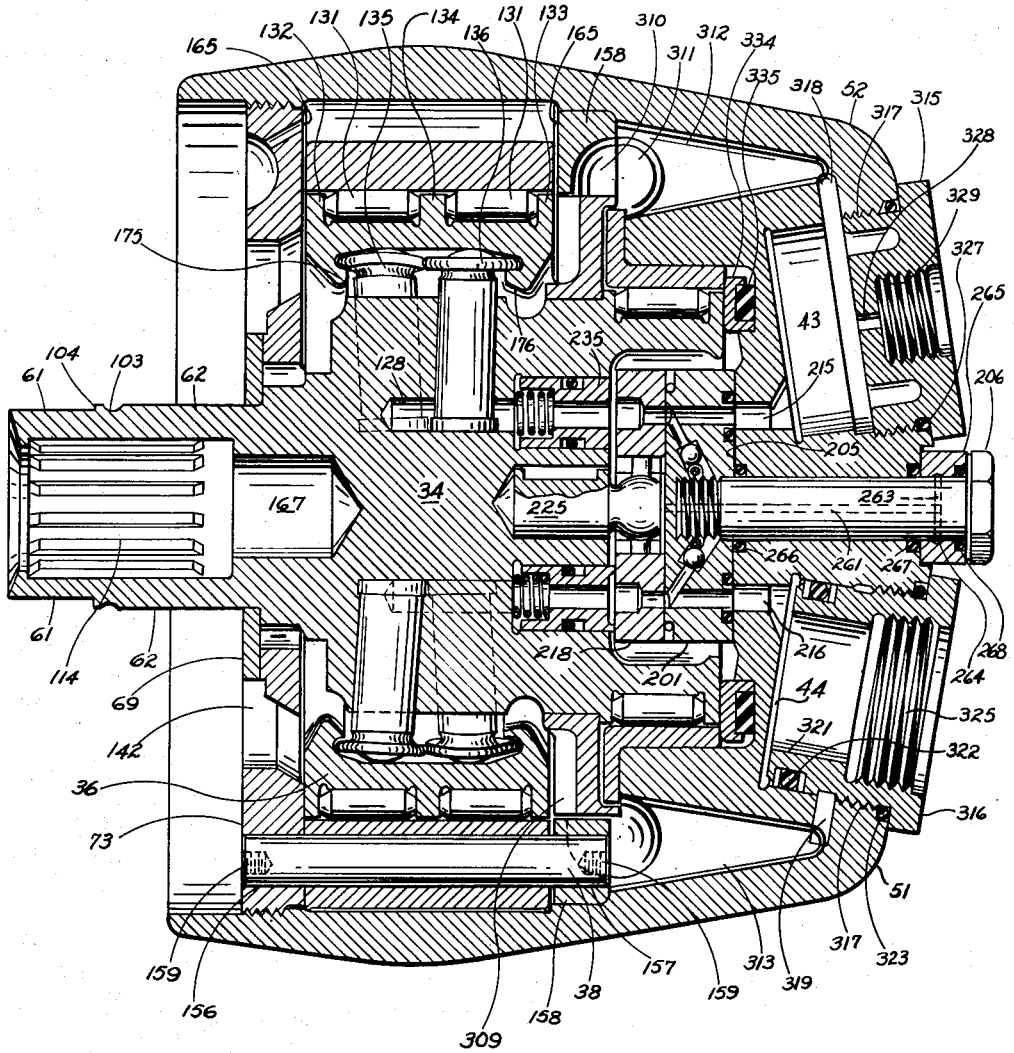
Fig. 7 is a sectional view of the pump casing and rotor taken in a generally horizontal plane passing through the rotor axis.

The pump mechanism is housed in a casing 30 (Figs. 1 and 2) of circular cross section, tapering slightly toward the ends. The enclosure of the machine is completed by an end cap 31 (Figs. 2 and 3) provided with a flange for securing the pump to a prime mover. Power is taken from the prime mover through a coupling member 33 (Figs. 2 and 6) engaged with a rotor 34 which has two rows of radial cylinders in which pistons 35 (Figs. 6 and 8) are reciprocable. The outer ends of the pistons engage a track ring 36 freely rotatable in a guide ring 37. The guide ring 37 is pivoted in the casing for movement about the axis 38 to positions of varying eccentricity under the influence of the reactions of the pistons 35, a control spring 39 and a pressure control device 40. The fluid intake of the pump is through a bushing 41 (Figs. 1, 2 and 6) from which fluid is conducted through a centrifugal impeller 42 (Fig. 6). From the supercharger, the fluid passes through the intake port 43 (Fig. 7) of the positive displacement stage, through the valve plates to the cylinders and back through the valve plates to the outlet port 44 (Figs. 7 and 1).

Casing and rotor mounting

The pump casing is illustrated in Figs. 1 to 7. It is contemplated that this casing be formed by forging, on account of the desirable characteristics of forged material, and the specific design shown herein is particularly adapted for forging. However, the casing may be produced by other operations such as casting. The casing 30 is constituted by a forged cup having an outer shell portion 49 and a massive conical end portion 50 formed with three bosses 51, 52 and 53, equally spaced about the central axis of the pump, for accommodation of the external fluid connections. The interior of the casing is finished for reception of the rotor, eccentric ring, valve mechanism, and so forth. The rotor 34 of the pump is formed with an annular extension 54 (Figs. 6 and 17) constituting the inner race of a needle bearing in which the rotor is supported. The rollers 55 of the bearing are guided by the flanges 56 and 57 on the rotor and are retained in an outer race 58 pressed into a bore 59 in the casing.

The drive end of the rotor is constituted by a shaft or extension 61 (Figs. 7 and 17) a portion 62 of which is dimensioned to fit a ball bearing 63 which supports the drive end of the rotor and serves as a thrust bearing to receive the end thrust. The outer race of the ball bearing 63 is received in a bore 66 in the end cap 31 of the casing. The end thrust of the outer race of the bearing is taken by a surface 67 (Figs. 4, 5 and 6). A washer 69 (Figs. 6 and 7) received against a shoulder 70 on the rotor transmits the thrust from the rotor to the inner race of the ball bearing 63.

The mounting of the end cap 31 in the casing 30 is most clearly shown in Figs. 3 to 6 inclusive. An externally threaded mounting ring 73 is threaded into the casing 30 adjacent the open end thereof, and is locked into place by an Allen set screw 74 (Fig. 6) disposed outwardly from a recess 75 in the outer face of the ring 73, into engagement with the casing. The end cap 31 is maintained in abutting relation with the ring 73 by a plurality of machine screws 76 received in counterbored holes 77 in the end cap and in tapped openings 78 in the ring. Radial alignment of the end plate 31 is attained by the fit of a flange 79 thereof within the outer end of the machined inner bore of the casing.

The outer portion of the end cap 31 is of rectangular outline, providing four outwardly extending ears 81 with holes 82 therethrough by means of which the pump is secured to its prime mover. Alignment with the prime mover is assured by the machined radial outer face 83 of the end cap and the shoulder 84 concentric with the pump axis which is adapted to be received in a mating bore of the prime mover.

Leakage between the casing and end cap is prevented by an O-ring or equivalent seal 86 received in a circumferential recess 87 at the inner face of the end cap. Counterbores 88 provide for the reception of O-rings 89 fitted over the end cap mounting bolts 76 to prevent leakage along the bolts. The end portion 61 (Figs. 6 and 17) of the rotor shaft, which extends almost to the outer face of the end cap, provides for the mounting of a rotary shaft seal 91 (Fig. 6). Since such shaft seals are well-known articles of commerce, and the invention is not restricted to the adaption of a particular type of seal, no details of the seal are shown herein. The seal 91 is received in a bore 92 in the end cap. Leakage of oil along the outside surface of the seal is prevented by an O-ring 93 fitted in a counterbore 94 and retained in a ring 95 screwed into a threaded counterbore 96, which also retains the seal 91. The retainer 95 is locked in place by a snap ring 96 retained in a groove 97 in the inner surface thereof and having a projection 98 extending through one of three notches 98a in the end of the retainer into one of four slots 99 in the face 83, extending from the threaded bore 96. Leakage of oil between the rotor shaft 61 and the shaft seal 91 is prevented by an O-ring 101 retained by a cup 102 fitted on the shaft 61 between the rotary shaft seal and the ball bearing. The O-ring 101 is retained in a groove 103 (Figs. 7 and 17) on the rotor shaft intermediate the portions 61 and 62, and the cup 102 is retained against a shoulder 104.

Any oil accumulated in the interface between the prime mover and the pump is collected in the lower one of four circumferential recesses 106 (Figs. 3, 5, and 6) in the face 83 of the pump end cap. Accumulated oil is drained by removing the appropriate one of pipe plugs 107 closing radial bores 108 connecting with the recesses 106. Preferably the inner face of the end cap 31 is forged with pockets 121 (Figs. 4 and 6) to reduce its weight. A circumferential groove 122 (Figs. 3 and 6) in the face of the end cap accommodates sealing wires for the mounting bolts 76.

The connection of the prime mover to the cylinder block 34 is effected by a coupling member 33 (Figs. 2 and 6) having a splined outer end portion 111 for reception in a splined socket of the prime mover, a reduced intermediate portion 112 and a splined inner portion 113 received in a splined socket 114 in the shaft portion of the cylinder block 34. The coupling member is retained by a snap ring 115 engaged behind a shoulder 116 at the mouth of the opening 114.

*Cylinder block and track ring*

Figure 8:
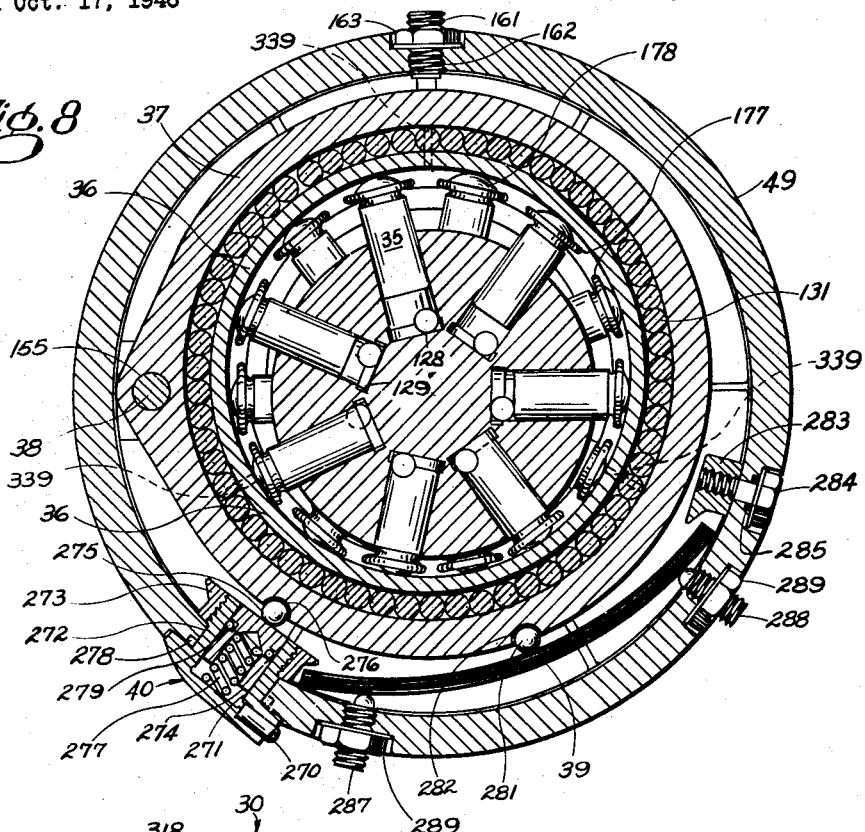
Fig. 8 is a cross sectional view of the pump.

Proceeding now to a detailed description of the rotor or cylinder block, it is shown in the machine in Figs. 6, 7, and 8 and removed from the machine in Figs. 16, 17, and 18. As previously stated, the cylinder block 34 is mounted for rotation on a needle bearing 55 and a ball bearing 63 fixed in the casing assembly and is driven through its shaft extensions 61 and 62. The rotor is of generally cylindrical form, and comprises a cylinder block portion 126 having two staggered rows of substantially radial cylinders. Seven cylinders are shown in each row, but any convenient number may be provided. Flow of fluid to and from the cylinders is effected through seven passages 128 directed longitudinally of the cylinder block, each communicating with one cylinder in each row. As will be seen in Figs. 6 and 7, the passages 128 may be simply drilled into the block to a sufficient depth to intersect the cylinder bores 127. The inner ends of the cylinders of the two rows overlap as viewed from the end of the cylinder block, so that a single passage 128 may pass into a cylinder of each row, entering the cylinders of the right-hand row of Fig. 6 at the clockwise side of the cylinder as viewed in Fig. 8 and entering the cylinders of the other row at the opposite side. The pistons 35 are dimensioned for close sliding fit in the cylinders 37, except for the lower ends of the cylinders, which are recessed to a slightly larger diameter 129 to facilitate tooling operations.

Before proceeding to a description of the control of the flow of fluid to and from the pistons through the passages 128, the mechanism for effecting reciprocation of the pistons and certain details of the cylinder block will be described. The pistons are reciprocated by engagement with a track ring 36 (Figs. 6, 7, and 8) which is mounted for rotation about an axis eccentric to that of the cylinder block with the result that each piston is withdrawn from its cylinder during one half turn of the rotor and forced into the cylinder during the other half turn. The track ring 36 is rotated within a guide ring 37 which forms the outer race of a double-row needle bearing employing rollers 131 (Figs. 5 and 6). The outer surface of the track ring is formed with marginal flanges 132 and 133 and a medial flange 134 (Fig. 7) for guidance of the rollers and with ground bearing races 135 and 136 intermediate the flanges.

For reasons which are fully explained in my copending application Serial No. 687,399, filed July 31, 1946, for Hydraulic Fluid Mechanism, the track ring 134 is driven positively from the rotor shaft by an Oldham type coupling. The Oldham coupling is constituted as follows: The rotor adjacent the cylinder block proper is milled away to form a rectangular portion 140 with flats 141 (Figs. 16 and 17). The flats 141 provide driving engagement with an intermediate coupling member 142 (Figs. 13 to 15) which in turn drives the track ring 37 illustrated in Figs. 10 to 12 inclusive. The coupling member 142 is ring-shaped, with an ovate internal opening 143 for clearance over the cylindrical portion 144 of the cylinder block and with two outstanding segments 145, the opposed inner surfaces of which are spaced for sliding engagement on two of the flats 141. The coupling member 142 is retained on the rotor between the shoulder 146 of the rotor and the thrust washer 69 (Fig. 6). Adjacent the projections 145, the coupling member 142 is formed with outstanding lugs 148 between which are milled or otherwise formed parallel-sided slots 149. The track ring 37 is provided with two diametrically opposed projections 151 proportioned for sliding engagement in the slots 149. As will readily be seen, the coupling thus constituted accommodates displacement between the axes of the rotor and track ring by radial sliding movement of the coupling member 142 with respect to the rotor and radial sliding movement of the lugs 151 in the slots 149 in quadrature thereto, and the track ring is always driven at the same angular velocity as the rotor.

We may now consider the mounting of the guide ring 37 in the casing, which is illustrated in Figs. 6, 7 and 8. The guide ring is hinged on a pivot pin 38 mounted in a bore 155 in the ring and parallel to the axis thereof. One end of the pivot pin is supported in a bore 156 in the end cap mounting ring 73, and its other end is supported in an aligned bore 157 in a ring 158 fitted into the casing. The ring 158, as will be seen, also constitutes the scroll for the supercharging stage of the pump. Tapped holes 159 in the ends of the pivot pin facilitate its removal.

As the guide ring 37 swings upwardly toward its position shown in Fig. 8, the eccentricity of the guide ring with respect to the rotor will be increased and thereby the stroke of the pistons and displacement of the pump will be correspondingly increased. The guide ring 37 may swing downward to a position of zero eccentricity of the ring with respect to the rotor, in which case the displacement is zero. Upward movement of the ring 37 is limited by stop stud 161 threaded into a tapped hole 162 in the top of the casing and locked by a jam nut 163. By adjustment of the stop stud 161, the maximum displacement may be set at any desired point within the range of the pump. In operation, the reaction of the pistons on the ring due to the fluid pressures against the pistons tend to move the ring downward to the zero position of eccentricity, and therefore the output of the pump may be regulated by providing a control force to counter this tendency. The mechanism therefor will be described presently.

The rings 73 and 158 are formed with radially extending ribs 165 (Figs. 5 and 7) which engage the edges of the guide ring and steady it against longitudinal movement or vibration. The rotor may be lightened by a drilling along its axis to form a cavity 167 (Fig. 7) which may be closed off by an aluminum cup 168 (Fig. 6) having a flanged end 169 engaging the bottom of the hole 114.

Under ordinary conditions of high speed operation, centrifugal force can be depended upon to engage the pistons with the track ring. At slow speeds, a slight pressure head in the fluid fed to the pump will force the pistons out. However, it is of great value to have a pump that will work positively even at low speeds and with a vacuum in the feed line. To achieve this result, there must be a means to draw the pistons outward in the cylinders. In some pumps, this result is accomplished by the use of springs. In the preferred embodiment of this invention, however, the inner surface of the track ring 36 is formed with inwardly directed marginal flanges 175 and 176 (Figs. 6 and 12) and the pistons are formed with flanges 177 near the outer ends which are retained outside the flanges 175 and 176. In normal operation, with the domed upper ends 178 of the pistons engaging the track ring, the piston head flanges 176 are out of contact with the track ring; but in the event of vacuum in the intake line, the pistons are drawn out positively by the flanges 175 and 176 acting against the piston flanges. To facilitate assembly of the pump, seven notches 181 may be milled through the inwardly directed portion of the flange 176 as shown. With the flange 176 thus cut away, the track ring 36 can be slipped over the rotor with the pistons retracted into the cylinders. Then the pistons of the innermost row can be pulled out, and their flanges engaged in the flange 175. The flanges of the outer row of pistons are passed through the cut-away portions 181 of the flange 176, after which the ring 37 is rotated so that the flanges of the pistons are retained intermediate the notches 181. The assembly can be made with a single notch 181, by rotating the rotor and ring relative to each other and engaging the pistons one at a time. The ring 37 is maintained in proper angular relation to the rotor by the Oldham coupling.

The cylinders 127 are bored at a slight angle to the plane normal to the cylinder block axis. In other words, the two rows of cylinders are slightly divergent toward their outer ends. The angle of inclination of the cylinder to the radius of the block may be of the order of two degrees. The inner surface 183 of the track ring is a right circular cylinder. The inclination of the pistons to the track ring causes the pistons to be rotated in the cylinders by the differential of movement between the guide ring and the center pistons. This feature is fully described in my above mentioned copending application No. 687,399 in which the advantages thereof are explained, and the angular relation of the cylinders to the track ring is claimed.

Valve mechanism

The valve mechanism of the pump is illustrated in Figs. 5, 6, and 19 to 25 inclusive. Basically, the valve mechanism is of a type common in rotary pumps and motors, in which the cylinders are provided with individual ports which are in communication with elongated kidney ports connected to the inlet and outlet lines. The elongated ports are so disposed that the individual cylinder ports are in contact with the intake port during the rotational period in which the piston is withdrawn from the cylinder, and are in contact with the outlet kidney port during the other half of the revolution. Valve mechanisms of this sort present many problems such as prevention of leakage, prevention of undue friction and scoring of valve plates, and assurance of free flow. The unbalanced forces on the valve parts due to the difference between inlet and outlet pressures present another problem. As will be seen from the valve mechanism embodied herein, many novel features have been incorporated herein to overcome difficulties previously experienced with this type of valve mechanism and to minimize the usual requirements of extreme precision in machining and assembly of the parts of the valve mechanism. The general arrangement of the valve mechanism in the pump is illustrated in Figs. 6, 7 and 19, the rotating valve plate in Figs. 20 to 22 and the stationary valve plate in Figs. 23 to 25. The stationary valve plate 201 is of a simple disk-shaped outline, and is formed with two kidney-shaped ports, an inlet port 202 and an outlet port 203 symmetrically disposed relative to the pump axis. The central portions of the slots 202 and 203 are milled only partially through the valve plate, leaving strengthening ribs 204 to counteract the tendency of fluid pressure to expand the valve plate. The valve plate is mounted against the finished plane inner surface 205 of the end portion 50 of the casing, and is held in place by a machine bolt 206 (Fig. 6) passing through an axial bore 207 in the casing. The bolt 206 is received in a tapped central hole 208 of the valve plate. The valve plate is held against rotation by a pin 209 (Fig. 6) received in a bore 210 in the casing and a drilled hole 211 in the outer surface of the valve plate. The normal thrust due to fluid pressure tends to maintain the valve plate 201 in close engagement with the casing. Leakage of fluid from the ports 202 and 203 along the outer face of the valve plate is inhibited by O-rings or equivalent seals retained in milled slots 213 and 214 in the outer face of the valve plate surrounding the ports. The intake port 202 opposes a kidney shaped passage 215 in the casing and the outlet port 203 opposes a similar opening 216 in the casing.

The rotary valve plate 218 is formed with seven ports therethrough, one for each of the fluid passages 128. The fluid passages 219 each comprise a circular opening 220 bored into the valve plate 218 from its inner face 221 and an arcuate milled slot 222 formed in the outer surface 223, which engages the stationary valve plate. The openings 220 and 222 are so proportioned so as to be of approximately equal cross sectional area and they are joined by a tapered portion 223. The valve plate 218 is rotated with the cylinder block by a construction similar to a universal joint. It comprises a plug 225 (Fig. 19) fitted in a bore 226 in the valve plate end of the rotor, and rotated positively with the cylinder block by a key 227. The plug 226 is formed with a rounded head 228 projecting from the cylinder block into a central opening 229 in the valve plate 218. The opening 229 is formed with diametrally opposed slots 230 which receive, for driving engagement, a pin 231 fixed transversely in the head 228 of the plug 225. By means of this construction, the valve plate 218 is constrained to rotate with the cylinder block 224 but may adapt any axial or angular rotation with the cylinder block necessary to conform to the valve plate 201.

The ports 202, 203, and 222 are so proportioned that, except for a short arc at the dead center positions of the pistons, the cylinders are in communication with either the intake or exhaust port during the entire rotation.

The valve plates are maintained in engagement with each other principally through the pressure of the fluid through the agency of plungers 235 freely slidable in the enlarged end portion 236 of the passages 128. Each plunger 235 is formed with a circumferential groove 237 in which is retained a sealing ring 238, and is formed with a central bore 239 for passage of the fluid, the bore 239 terminating in a shallow counterbore 240 in the outer end of the plunger and in a deeper counterbore 241 in the inner end of the plunger. A compression spring 242 contained in the counterbore 241 and in engagement with the inner end of the enlargement 236 of the fluid passage normally urges the plunger 235 against the valve plate 218. Thus when the pump is not in operation the two valve plates are maintained lightly in engagement by the force of the springs 242. With the pump in operation, a relatively large force, tending to separate the valve plates, is exerted by the confined fluid. The force tending to separate the valve plates will obviously be proportional to the fluid pressure and will be principally exerted on the output or high pressure side of the valve plate. The force will vary slightly with the rotation of the pump, which varies the effective area over which the force is exerted. In the pump described herein, the separating force is countered by exerting a force on the inner side of the valve plate 218 which is somewhat larger than the force tending to separate the plates and is distributed in approximately the same manner. The seating force in this invention is delivered by the pressure of the confined fluid against the annular inner faces of the plungers 235, which are so proportioned that their total area is slightly larger than that of the fixed ports 202 and 203 plus such portions of the ports 222 as may be in communication with the fixed ports and overlying the unbroken surface of the valve plate 201. The force exerted on the valve plate 218 by the plungers will bear a definite relation to the separating force, will always be slightly greater, and will have approximately the same center of application. In this way, the proper seating force is obtained without unbalanced forces on any side of the valve plates.

The small amount of fluid which works from the ports onto the faces of the valve plates will be collected in a shallow central recess 245 of the plate 201 or in a peripheral groove 246. The void space 245 is drained through two radial passages 247 in the valve plate and the groove 246 through a plurality of radial slots 248. The escaping fluid will lubricate the relatively moving faces of the plates.

*Pressure control device*

We will now take up the manner in which fluid pressure is derived from the valve plate to actuate the hydraulic control mechanism 40 (Figs. 1 and 8). While the pump has been described as running in one direction and having an intake side and outlet side of the valve plate 201, actually the pump may be operated in either direction, and either of the passages 202 and 203 may be the high pressure conduit. Means are incorporated in the valve plate 201 and its retaining bolt 206 to take off fluid under pressure from either of the passages 202 or 203 to balance partially the reaction of the pistons on the guide ring 37. The central hole 208 of the fixed valve plate communicates with the kidney-shaped ports 202 and 203 through two angularly disposed radial passages 252 and 253 (Fig. 19) which intersect the ports 202 and 203 at the face of the valve plate. The conduits 252 and 253 are formed with enlarged inner bores 254 and 255, the ends of the enlargements forming seats for ball check valves 256 which are retained against dropping out of their seats by a spring ring 257 disposed in a groove 258 recessed in the hole 208. The retaining bolt 206 (Figs. 7 and 19) is centrally drilled to form an oil passage 261 communicating with the recess 258 by a cross drilled passage 262 in the bolt. A cross drilled passage 263 (Fig. 7) adjacent the head of the bolt 206 delivers fluid to an internal circumferential channel 264 in a collar 265 retained against the face of the casing by the bolt 206. O-ring or equivalent seals 266, 267, and 268 (Fig. 7) prevent escape of fluid along the bolt 206 or around the collar 265.

The collar 265 is welded or otherwise united to a pressure tube 270 (Figs. 1 and 2) which is sealed into the cylinder portion 271 (Fig. 8) of the control device 40. The cylinder 271 is disposed in a counterbored opening 272 in the casing wall 49 and is retained by a flanged nut 273 threaded on the inner end of the cylinder and bearing on the inner face of the casing. The fluid entering the cylinder 271 through the conduit 270 exerts pressure against a floating piston 274, the face of which engages a bearing ball 275 mounted in a semi-cylindrical groove 276 in the guide ring 37. A compression spring 277 maintains the plunger 274 in engagement with the ball 275. Seals 278 and 279 inhibit leakage of fluid along the inner and outer surfaces of the cylinder 271. It will readily be seen that the ball checks 256 (Fig. 19) will close off the control passages from the low pressure inlet, but will permit passage of fluid thereinto from the outlet. The force of the fluid confined in the cylinder 271 urges the guide ring upward, opposing the piston reaction which tends to centralize the ring with the rotor. As will readily be seen, the force exerted by the plunger 274 is proportional to the output pressure of the pump. The pump input pressure, in the applications for which this type of control is contemplated, is normally very small relative to the output pressure. Therefore, the reaction of the pistons on the guide ring 237 is substantially proportional to the output pressure. Thus the difference between the moments of the two forces about the pivot of the pin 248 is substantially proportional to the pressure delivered by the pump. The area of the plunger 279 is such that the force exerted by it is slightly less than the resultant of the piston reactions.

The output pressure is limited and regulated by the leaf spring 39 (Figs. 6 and 8) which opposes the resultant hydraulic moment. The central portion of the spring 39 bears against a ball 281 in a depression 282 in the guide ring. The ends of the spring are disposed under the flange of the nut 273 and under a flange of a spring-retaining nut 283 held by a machine screw 284 provided with a seal 285. When the difference between the piston and plunger reactions exceeds the initial tension of the spring 39, the guide ring 37 will rotate clockwise (Fig. 8) to decrease the output; or, if the output is completely blocked, to bring the pump output to zero.

The cutout pressure of the pump may be varied by adjusting studs 287 and 288 bearing against the spring approximately one eighth to one sixth of its length from the ends. The studs are locked in adjustment by nuts 289. By virtue of the controlling arrangement shown herein, the large portion of the force required to oppose the piston reaction is delivered by the hydraulic plunger 274. The spring 39 may therefore be of relatively small tension and small size. The spring 39 is of such form as to conform to the natural envelope of the pump, maintaining the compactness of the pump.

*Supercharging stage*

We are now in a position to describe the centrifugal supercharging stage and general arrangement of the casing and coupling for fluid flow through the centrifugal stage. The fluid intake of the pump is through a hexagon-headed bushing 41 (Fig. 6) threaded inside and outside, and screwed into the bore 301 in the boss 53 of the end of the casing. The threaded bore 301 is disposed at a slight angle to the pump axis. A seal 302 received in a counterbore beneath the flange of the bushing 41 serves as a fluid seal. From the inlet bushing 41, fluid passes into a chamber 303 and then through two milled passages 304 (Figs. 6 and 9) to the interior of the casing adjacent the periphery of the valve plate 201. Fluid flows into a space between the peripheries of the valve plates 201 and 218 and the inner surface of the extension 54 of the rotor, which is the inlet chamber of the centrifugal impeller. The impeller is constituted by radial passages in the cylinder block and in an impeller ring 42 (Figs. 6 and 18) the ring being pressed or shrunk onto the rotor adjacent the flange 57, its position being indicated by dot and dash lines in Fig. 17. The impeller passages are preferably seven in number, spaced intermediate the fluid passages 128. The passages 307 enter the end of the cylinder block adjacent the rotary valve plate and are directed approximately 45 degrees to the axis, and then radially through the cylinder block and communicate with aligned passages 308 in the impeller ring 306. The impeller ring 306 is milled away on its inner face, that is, the one toward the pistons, forming recesses between the passages 308.

Figure 9:
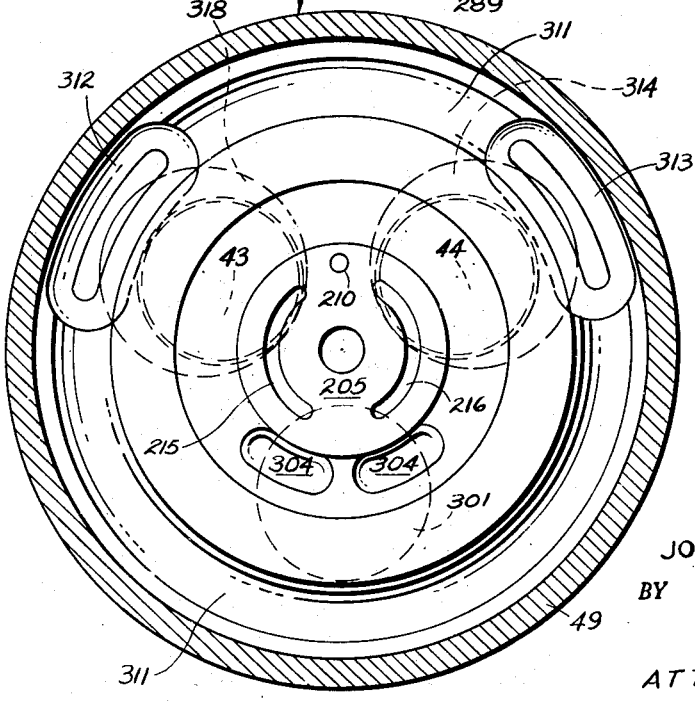
Fig. 9 is a sectional view of the pump casing illustrating the inside of the casing end.

The fluid from the impeller is discharged into an annular space 310 defined by the inner surface of the ring 158 mounted in the casing adjacent the periphery of the impeller and by a continuous semi-circular milled groove 311 in the inner face of the end of the pump casing (Figs. 6 and 9). Outflow of oil from the chamber 310 is effected through one of two deep milled pockets 312 and 313 (Figs. 7 and 9) extending axially into the casing end from the channel 311. The milled pockets 312 and 313 are angularly aligned with the fluid flow openings 43 and 44 respectively.

The openings 43 and 44, which are located approximately 120 degrees from the intake opening 41, are bored into the bosses 52 and 51 respectively. The outer openings 43 and 44 constitute the intake and discharge ports for the positive displacement stage of the pump and are connected to the valve plates through the passages 215 and 216. In order to adapt the pump for rotation in either direction, the openings 43 and 44 are adapted for interchangeable use as a means of connection between the supercharging stage and positive displacement stage, and as the discharge orifice of the pump. The openings 43 and 44 are therefore bored out in identical fashion and are adapted to their specific functions by the cap 315 and sleeve 316 which are interchangeable, are formed with hexagon heads, and are adapted to be retained by the threaded portions 317 of the bores 43 and 44. Immediately within the threaded portion, a deep offset recess 318 is bored in the side wall of each of the openings 43 and 44, breaking into the pockets 312 and 313.

As the pump is set up, in Fig. 7, fluid flows from the supercharger into the space 310, through the conduit 312, the recess 318, the chamber 43, and the duct 215 into the valve mechanism. The operation of the valves and cylinder block has been described. The pocket 311 and recess 319 are blocked off from the outlet opening 44 of the pump by an extension 321 of the sleeve in which a sealing ring 322 is mounted. A sealing ring is also fitted in a counterbore 323 at the mouth of the opening 44. The discharge passage 216 from the positive displacement stage enters the opening 44 at the end thereof, and fluid flows through the sleeve 316 which is internally tapped at 325 for the reception of a fluid delivery conduit.

The cap 315 and the sealing ring 327 substantially close off the outer opening of the cavity 43. The cap 315 is formed, however, with a small orifice 328 therethrough, communicating with a tapped opening 329 which is adapted for reception of a pipe fitting. A pipe plug may be inserted in the opening 329 completely sealing the external opening of the cavity 43 if desired, or a low pressure return line may be connected to the cap 315 in which case a certain amount of low pressure oil from the centrifugal stage is bled from the pump, the amount of oil being governed by the size of the orifice 328. The purpose of bleeding oil in this manner is to provide a small circulation of oil to cool and lubricate the pump when, on account of blocking of flow in the high pressure discharge line, there is no discharge of oil from the positive displacement stage.

Sealing means are provided to inhibit circulation of oil from the supercharger back into the pump intake passage through the needle bearing 55. The periphery of the centrifugal impeller 42 is formed with a longitudinally extending flange 333 immediately adjacent the periphery of the bearing race 58 extending into the annular recess 311 which, by centrifugal action, reduces the tendency of the fluid to flow between the impeller and the bearing race and forms a primary seal. A secondary seal is fitted between the end of the rotor and the inner face of the casing end, constituted by a flanged ring 334, the face of which is pressed against the end of the rotor by a ring 335 of synthetic rubber or the like seated in the flanged ring 334. A lip 336 (Fig. 6) forming an extension of the inner flange of the ring extends within the intake passage 304 to prevent rotation of the sealing ring.

It is inherent in the nature of pumps such as that described herein, that a certain amount of fluid will escape between the moving parts. This loss may be minimized by precise fitting of parts but can not be entirely eliminated. Provision is made in this pump to utilize the escaping oil to lubricate the pump and to scavenge excess oil from within the casing. The valve plates 201 and 218 are lubricated by fluid escaping from the valve ports. Oil emerging from the inner face of the valve plates through the passages 247 and 248 in the valve plate 201 or escaping around the plungers 235 returns to the intake of the supercharging stage. Oil passing through the needle bearing 55 from the supercharger and through the primary and secondary seals also returns to the supercharger intake. Fluid passing between the pistons 35 and the cylinders is thrown against the inside of the track ring 36 by centrifugal force and through radial passages 336 in the track ring to the outer race, serving to lubricate the track ring needle bearings and finally escaping to the periphery of the casing. Fluid which escapes past the seal 101 on the drive shaft returns to the casing through passages 340 (Fig. 6) in the end cap and 341 in the end cap mounting ring to the periphery of the casing. Any excessive accumulation of oil in the casing will be thrown into the supercharger outlet passages by the impeller 42.

Modified end cap retaining structure

Figure 26 illustrates a modified structure for the retention of the end cap 31 in the casing 30 which eliminates the use of a threaded retaining ring such as 73 (Figs. 5, 6 and 7). In the modified construction, a retaining ring 73a is employed which is similar to the form 73 previously described except that it is designed for retention by an expanding snap ring 360 retained in a groove 361 machined in the inner surface of the casing. The retaining ring 73a abuts against a small shoulder 362 in the casing during assembly and is held against movement out of the casing by the snap ring 360. The end cap 31 abuts against a shoulder 363 in the casing. Machine screws 76, as illustrated in Figures 3 and 5, pass through the end cap and are threaded into the retaining ring 73a. When the screws are tightened the end cap is pulled tight against the shoulder 363 and the retaining ring against the snap ring 360.

Oil bleed line check valve

As previously described, the cap 315 (Fig. 7) is designed for the connection of a bleed line to draw off a portion of the fluid which is passed through the supercharging stage of the pump. In certain applications, where there is a possibility of introduction of air into the feed line of the pump, and in which rapid self-priming of the pump is important, the presence of the vent connection to the cap 315 might delay priming because it would be possible to pump air in through the bleed line. To obviate this difficulty in such applications as it may appear, a modified bleed line cap 315a (Fig. 27), incorporating a check valve, may be employed. The plug 315a is threaded into the pump and sealed in the same manner as the plug 315 previously described. It comprises an elongated central portion 370 extending farther into the port 43 and having the bleed orifice 328 in its inner end. It includes a check valve comprising a ball 371 held against the outer end of the orifice 328 by a compression spring 372. The outer end of the spring 372 engages the retainer 373, shown enlarged in Fig. 28. The retainer 373 comprises a disk portion 374 having a number of holes 375 therethrough for the passage of fluid and formed with a central boss 376 which locates the spring and prevents excessive movement of the ball 371. The retainer 373 is disposed in engagement with a shoulder 377 and is held in position by a snap ring 378. The cap 315a is provided with an internally threaded opening 329 for the attachment of the bleed line.

Modified pressure regulator with a relief valve

With the form of pressure regulator 40 (Fig. 8) previously described and with the check valves 256 incorporated in the line through which fluid under pressure is fed to the cylinder 271, under some conditions of operation, the check valves might impede the escape of oil from the cylinder 271 and thus undesirably delay the response of the pump to excessive output pressures. One solution to this problem would be to eliminate the check valve from the high pressure side of the pump. Another way would be to eliminate both check valves and do away entirely with the connection to the intake side of the positive displacement stage.

The adoption of either of these expedients would make the pump operable in only one direction. In order to change the direction of shaft rotation and fluid flow, the check valve ball would have to be shifted from one passage 256 to another or the valve plate 201 would have to be rotated 180 degrees about its central axis.

The modified form of pressure regulator device illustrated in Figs. 29 to 31 is provided with a pressure relief valve to permit ready escape of the fluid from the cylinder 271 in the event of excess load on the pump. The modified form of regulator comprises a head 401 and a cylinder portion 271, the cylinder being similar to that of the form previously described. The plunger 274 operates against the roll 275 and the regulating device is retained in place by a nut 273. The sealing rings 272 and 278 and the spring 277 are of the same form as in the previously described regulator. The pressure tube 270 is brazed into the head portion 401 in alignment with the drilled passage 403, which is intersected by a passage 404 communicating with the cylinder 271. A third passage 405 having a reduced end portion 406 likewise intersects the passage 403. The pressure relief valve disposed in the chamber 405 comprises a ball 407, a plunger 408 and a compression spring 409 which is retained between the head of the plunger and an Allen set screw 410 retained in the threaded outer portion 411 of the bore 405. The set screw 410 is locked by a second Allen set screw 412 having a turned portion 413 cooperating with an O-ring or similar seal 414 to prevent escape of fluid from the relief valve. In the event that excess pressure is developed within the cylinder 271, the ball 407 is lifted from its seat, permitting fluid to escape from the cylinder through a diagonal passage 416 in the head 401. The outer end of the passage 416 is closed by a plug 417 brazed in place. Discharge of the escaping fluid is effected through the passage 418 formed by a short length of tubing brazed into the head 401 and entering a passage 419 drilled through the shell 49 of the pump. A sealing ring 420 disposed in a counterbore 421 in the casing prevents leakage of fluid. As will be seen, if the pressure within the pump rises rapidly, tending to drive the plunger 274 into the cylinder and fluid is unable to escape from the cylinder through the check valves in the fixed valve plate 201, the fluid will lift the ball 407 in the relief valve and be discharged into the pump casing.

The relief valve 407 forms an additional means for regulating the cut-off point of the pump, since by adjusting the point of operation of this valve, the maximum pressure in the cylinder 271 may be set to any desired value. The maximum pressure in the cylinder and the tension of the spring 39 (Fig. 8) determine the cut-off point of the pump.

As has been stated, most of the structure disclosed herein as a pump is also adapted for use in hydraulic motors. In use as a motor, the supercharger is unnecessary, and may be cut out by inserting sleeves 316 in both passage 43 and passage 44. Of course, in a machine designed as a motor the supercharging impeller and connecting passages therefor may be omitted. The variable-volume feature would ordinarily be omitted in a motor, and may be in a pump, by fixing the guide ring 37 in the casing and omitting the mechanisms which control the position of the ring.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a fluid displacement machine, a rotatable cylinder block having radially directed cylinder openings therein, pistons in the cylinders, an annular member surrounding the cylinder block and engaged by the pistons, the member being mounted for motion with respect to the cylinder block so as to vary the displacement of the machine by varying the eccentricity of the central axis of the member with respect to the axis of rotation of the cylinder block, the effect of fluid pressure in the cylinder block normally tending to reduce the displacement to zero, opposed means responsive to fluid pressure within the machine tending to move the member in an opposite direction, the means tending to decrease displacement having the greater effect, and initially stressed resilient means increasingly stressed as the displacement is decreased.

2. In a fluid displacement machine, a rotatable cylinder block having radially directed cylinder openings therein, pistons in the cylinders, an annular member surrounding the cylinder block and engaged by the pistons, the member being mounted for motion with respect to the cylinder block so as to vary the displacement of the machine by varying the eccentricity of the central axis of the member with respect to the axis of rotation of the cylinder block, the effect of fluid pressure in the cylinder block normally tending to reduce the displacement to zero, opposed means responsive to fluid pressure within the machine tending to move the member in an opposite direction, the means tending to decrease displacement having the greater effect, the differential effect of the opposed means being substantially less than the effect of either means, and initially stressed resilient means increasingly stressed as the displacement is decreased.

3. In combination with a fluid displacement machine having radially directed cylinders, pistons therein, and control means for effecting reciprocation of the pistons, the control means being movable from a position in which the pistons operate through a full stroke to a cutoff position in which the pistons are stationary with respect to the cylinders, and in which the reactions of the pistons on the control means urge it toward its cutoff position; regulating means constantly urging the control means toward its full-stroke position comprising a device responsive to fluid pressures within the pump and a stressed resilient member operatively engaging the control means to provide a constant biasing force opposing the reactions of the pistons upon the control means whereby the control means is caused to assume a cut-off position relatively rapidly when the difference between the actions of the control means and the regulating means exceeds that of the stressed member.

4. In combination with a fluid displacement machine having radially directed cylinders, pistons therein, and control means for effecting reciprocation of the pistons, the control means being movable from a position in which the pistons operate through a full stroke to a cutoff position in which the pistons are stationary with respect to the cylinders, and in which the reactions of the pistons on the control means urge it toward its cutoff position; regulating means constantly urging the control means toward its full-stroke position comprising a device responsive to the pump output pressure and a stressed resilient member operatively engaging the control means to provide a constant biasing force opposing the reactions of the pistons upon the control means whereby the control means is caused to assume a cut-off position relatively rapidly when the difference between the actions of the control means and the regulating means exceeds that of the stressed member.

5. In combination with a fluid displacement machine having cylinders, pistons therein, and control means for effecting reciprocation of the pistons, the control means being movable from a position in which the pistons operate through a full stroke to a cutoff position in which the pistons are stationary with respect to the cylinders, and in which the reactions of the pistons on the control means urge it toward its cutoff position; regulating means constantly urging the control means toward its full-stroke position comprising a device responsive to the pump output pressure and comprising a flat spring and means to vary the initial stress of the flat spring.

6. In combination with a fluid displacement machine having cylinders, pistons therein, and control means for effecting reciprocation of the pistons, the control means being movable from a position in which the pistons operate through a full stroke to a cutoff position in which the pistons are stationary with respect to the cylinders, and in which the reactions of the pistons on the control means urge it toward its cutoff position; regulating means urging the control means toward its full-stroke position comprising a flat spring, a part on the control means engaging the midpoint of the spring, abutments at the ends of the spring, and adjustable means between the abutments and midpoint for biasing the spring toward the control means.

7. In combination with a fluid displacement machine having cylinders, pistons therein, and control means for effecting reciprocation of the pistons, the control means being movable from a position in which the pistons operate through a full stroke to a cutoff position in which the pistons are stationary with respect to the cylinders, and in which the reactions of the pistons on the control means urge it toward its cutoff position, regulating means urging the control means toward its full-stroke position comprising a fluid-pressure-responsive device engaging the control means, fluid connections between the said device and the inlet and outlet passages respectively, of the machine, and check valves in the said fluid connections so arranged that the device is isolated from the passage under lower pressure and actuated by fluid from the passage of higher pressure.

8. In a fluid displacement machine, a cylindrical casing, a cylinder block of the radial-cylinder type rotatable in the casing, pistons in the block, a track ring engaging the heads of the pistons, a guide ring in which the track ring is supported, a pivotal mounting for the guide ring whereby it may move to vary the eccentricity of the track ring with respect to the cylinder block, a hydraulic cylinder radial to the casing, a piston in the cylinder engaging the guide ring for rotation thereof about its mounting, a flat spring disposed circumferentially of the casing between the guide ring and casing, abutments in the casing for the spring, a part on the ring engaging the spring intermediate the abutments, and means movable radially of the casing engaging the spring to vary the tension thereof.

9. In a fluid displacement machine, a casing, a cylinder block of the radial-cylinder type rotatable in the casing, pistons in the block, a track ring engaging the heads of the pistons, a mounting for the track ring whereby it may move to vary the eccentricity of the track ring with respect to the cylinder block, a hydraulic cylinder radial to the casing, a piston in the cylinder connected to move the track ring, a flat spring disposed between the track ring and casing, abutments in the casing for the spring, a part connected to the ring engaging the spring intermediate the abutments, and means movable radially of the casing engaging the spring to vary the tension thereof.

10. In a fluid displacement machine, a cylindrical casing, a cylinder block of the radial-cylinder type rotatable in the casing, pistons in the block, a track ring engaging the heads of the pistons, a guide ring in which the track ring is supported, a mounting for the guide ring whereby it may move to vary the eccentricity of the track ring with respect to the cylinder block, a hydraulic cylinder radial to the casing, a piston in the cylinder engaging the guide ring for movement thereof, a flat spring disposed circumferentially of the casing between the guide ring and casing, abutments in the casing for the spring, and a part on the ring engaging the spring intermediate the abutments.

11. In a fluid displacement machine, a cylindrical casing, a cylinder block of the radial-cylinder type rotatable in the casing, pistons in the block, a track ring engaging the heads of the pistons, a guide ring in which the track ring is supported, a pivotal mounting for the guide ring whereby it may move to vary the eccentricity of the track ring with respect to the cylinder block, and a hydraulic device responsive to pressures within the cylinder block engaging the guide ring for rotation thereof about its mounting.

12. In a fluid displacement machine, a casing, a cylinder block of the radial-cylinder type rotatable in the casing, pistons in the block, a ring eccentric to the cylinder block for effecting reciprocation of the pistons, a pivotal mounting for the ring whereby it may move to vary the eccentricity of the ring relative to the cylinder block, a hydraulic actuator engaging the ring for rotation thereof about its mounting, a flat spring disposed circumferentially and externally of the ring, abutments in the casing for the spring, a part on the ring engaging the spring intermediate the abutments, and means movable radially of the casing engaging the spring to vary the tension thereof.

13. In a fluid displacement machine, a casing, a cylinder block of the radial-cylinder type rotatable in the casing, pistons in the block, a ring eccentric to the cylinder block for effecting reciprocation of the pistons, a mounting for the ring whereby it may move to vary the eccentricity of the ring relative to the cylinder block, a hydraulic actuator engaging the ring for movement thereof, a flat spring disposed circumferentially and externally of the ring, abutments in the casing for the spring, and a part on the ring engaging the spring intermediate the abutments.

14. In a fluid displacement machine, a casing, a cylinder block of the radial-cylinder type rotatable in the casing, pistons in the block, a track ring for reciprocating the pistons, a mounting for the track ring whereby it may move to vary the eccentricity of the track ring with respect to the cylinder block, a hydraulic cylinder radial to the casing, a piston in the cylinder connected to move the track ring, a flat spring disposed between the track ring and casing, abutments in the casing for the spring, a part connected to the ring engaging the spring intermediate the abutments, and means movable radially of the casing engaging the spring to vary the tension thereof.

15. In a fluid flow device, a rotary cylinder block; flow control means comprising a valve plate rotating with the cylinder block and a fixed valve plate, the valve plates being in face-to-face contact; fluid flow passages from the cylinders being aligned with ports in the rotating valve plate; means for approximately balancing forces exerted by fluid pressure on the face of the rotating valve plate comprising a plunger in each passage engaging the rotating valve plate and formed with an axial bore, the bore being recessed adjacent the valve plate end of the plunger, the plunger rim being disposed around the corresponding port; and a driving connection of the universal joint type between the cylinder block and the rotating valve plate.

16. In a fluid flow device, a rotary cylinder block; flow control means comprising a valve plate rotating with the cylinder block and a fixed valve plate, the valve plates being in face-to-face contact; fluid flow passages from the cylinders being aligned with ports in the rotating valve plate; and means for approximately balancing forces exerted by fluid pressure on the face of the rotating valve plate comprising a plunger in each passage engaging the rotating valve plate and formed with an axial bore, the bore being recessed adjacent the valve plate end of the plunger, the plunger rim being disposed around the corresponding port.

17. In a fluid flow device, a rotary cylinder block; flow control means comprising a valve plate rotating with the cylinder block and a fixed valve plate, the valve plates being in face-to-face contact; fluid flow passages from the cylinders being aligned with ports in the rotating valve plate; means for approximately balancing forces exerted by fluid pressure on the face of the rotating valve plate comprising a plunger in each passage engaging the rotating valve plate and formed with an axial bore, the plunger rim being disposed around the corresponding port; and a driving connection of the universal joint type between the cylinder block and the rotating valve plate.

18. A hydraulic device comprising a casing having inlet and outlet ports, a cylinder block mounted for rotation in the casing, the cylinder block having radially directed cylinder openings, pistons in the openings, and valve means for successively connecting the cylinder openings to the inlet port and then to the outlet port upon rotation of the cylinder block, a first annular member surrounding the cylinder block, a pivotal mounting for said first annular member supported by the casing, a second annular member mounted for coaxial rotation with respect to the first member and adapted to rotate in synchronism with the cylinder block and engaging the pistons, rotation of the annular members about the pivotal mounting serving to vary the eccentricity of the common axis of the members with respect to the axis of rotation of the cylinder block, means responsive to the pressure of fluid in the cylinder openings connected to the outlet port, the said means being supported by said casing and being adapted to rotate the annular members upon the mounting to increase the eccentricity of the axes in response to changes in fluid pressure, and biasing means disposed between the casing and the first annular member to provide a constant rotational force tending to increase the eccentricity of the axes.

19. The invention in accordance with claim 18, said fluid pressure responsive means comprising a piston connected to the first annular member.

20. The invention in accordance with claim 18, said fluid pressure responsive means comprising a piston connected to the first annular member and the component of force tending to change the eccentricity of the axes of the annular members with respect to the axis of the cylinder block due to the piston being less than the component of force due to the actions of the pistons in the cylinder openings upon the second annular member.

21. The invention in accordance with claim 18, said biasing means comprising spring means supported by the casing and engaging the first annular member.

22. The invention in accordance with claim 18, the component of force tending to increase the eccentricity of the axes of the annular members with respect to the axis of the cylinder block due to the fluid pressure responsive means being less than the component of force tending to decrease the eccentricity due to the action of the pistons in the cylinder openings on the second annular ring and the component of force due to the biasing means being greater than the first two named forces.

23. A hydraulic device comprising a casing having a valve end and a drive end, a cylinder block mounted for rotation in the casing, the cylinder block having radially directed cylinder openings, valve means comprising a first means associated with the casing and rotatable means associated with the cylinder block, the valve means being rotationally symmetric about the axis of rotation of the cylinder block and defining a valve face generally normal to the axis of rotation of the block, the valve members having cooperating parts and passageways for conducting fluid to and from the cylinder openings as the cylinder block rotates, pistons in the cylinder openings, the pistons normally being urged radially outward of the cylinder openings by fluid in the openings, an annular member surrounding the cylinder block mounted for rotation about an axis eccentric to the axis of rotation of the cylinder block, whereby during one-half cycle of rotation, the ring forces the pistons into the cylinder and during the other half cycle of rotation, the ring normally limits the outward movement of the pistons, a coupling device connected to the cylinder block and to the annular member for positively driving the member with the cylinder block, and means providing interengagement between the ring and pistons to withdraw the pistons from the cylinder in the event of non-action of fluid forces normally acting thereon.

24. The invention in accordance with claim 23, said last named means comprising a flange on the piston and an inwardly directed flange on the annular member for engaging the flange on the piston.

25. The invention in accordance with claim 23, said last named means comprising an inwardly directed flange on the annular member having a peripheral groove therein and a flange on the piston received in the groove.

26. A hydraulic device comprising a casing having a valve end and a drive end, a cylinder block mounted for rotation in the casing, the cylinder block having radially directed cylinder openings, valve means comprising a first means associated with the casing and rotatable means associated with the cylinder block, the valve means being rotationally symmetric about the axis of rotation of the cylinder block and defining a valve face generally normal to the axis of rotation of the block, the valve members having cooperating ports and passageways for conducting fluid to and from the cylinder openings as the cylinder block rotates, pistons in the cylinder openings, the pistons normally being urged radially outward of the cylinder openings by fluid in the openings, an annular member surrounding the cylinder block mounted for rotation about an axis eccentric to the axis of rotation of the cylinder block, whereby during one-half cycle of rotation, the ring forces the piston into the cylinder and during the other half cycle of rotation, the ring normally limits the outward movement of the pistons, fluid pressure means responsive to fluid in the passageways and connected between said casing and said annular member and increasing the eccentricity of the axis of the annular member with respect to the axis of the cylinder block in response to increasing pressure, a coupling device connected to the cylinder block and to the annular member for positively driving the member with the cylinder block, and means providing interengagement between the ring and pistons to withdraw the pistons from the cylinder in the event of non-action of fluid forces normally acting thereon.

27. The invention in accordance with claim 26, said last named means comprising a flange on the piston and an inwardly directed flange on the annular member for engaging the flange on the piston.

JOHN W. OVERBEKE.

References Cited in the file of this patent

UNITED STATES PATENTS

| Number | Name | Date |
|---|---|---|
| 2,006,880 | Benedek | July 2, 1935 |
| 2,074,068 | Ferris | Mar. 16, 1937 |
| 2,129,828 | Dunn | Sept. 13, 1938 |
| 2,129,886 | Syrovy | Sept. 13, 1938 |
| 2,130,299 | Ernst | Sept. 13, 1938 |
| 2,164,888 | Sassen et al. | July 4, 1939 |
| 2,273,468 | Ferris | Feb. 17, 1942 |
| 2,293,692 | Wylie | Aug. 18, 1942 |
| 2,299,233 | Hoffer | Oct. 20, 1942 |
| 2,299,234 | Snader et al. | Oct. 20, 1942 |
| 2,324,524 | Mercier | July 20, 1943 |
| 2,407,013 | Ifield | Sept. 3, 1946 |
| 2,426,588 | Benedek | Sept. 2, 1947 |
| 2,429,011 | Wylie | Oct. 14, 1947 |